(12) United States Patent
An et al.

(10) Patent No.: US 8,877,394 B2
(45) Date of Patent: Nov. 4, 2014

(54) FUEL CELL SYSTEM

(75) Inventors: Seong-Jin An, Yongin-si (KR);
Chi-Seung Lee, Yongin-si (KR);
Jin-Hwa Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 166 days.

(21) Appl. No.: 12/954,589

(22) Filed: Nov. 24, 2010

(65) Prior Publication Data

US 2011/0244342 A1    Oct. 6, 2011

Related U.S. Application Data

(60) Provisional application No. 61/321,398, filed on Apr. 6, 2010, provisional application No. 61/323,280, filed on Apr. 12, 2010.

(51) Int. Cl.
*H01M 8/06* (2006.01)
*H01M 8/04* (2006.01)
*H01M 8/24* (2006.01)

(52) U.S. Cl.
CPC ............ *H01M 8/04141* (2013.01); *Y02E 60/50* (2013.01); *H01M 8/241* (2013.01)
USPC ........................................ 429/414

(58) Field of Classification Search
USPC ........................................ 429/414
See application file for complete search history.

(56) References Cited

U.S. PATENT DOCUMENTS

| | | | |
|---|---|---|---|
| 6,066,048 A * | 5/2000 | Lees | 470/110 |
| 7,156,379 B2 | 1/2007 | Tanihara et al. | |
| 2005/0233201 A1 | 10/2005 | Yoshizawa et al. | |
| 2005/0275120 A1 | 12/2005 | Sasamoto | |
| 2006/0147773 A1 * | 7/2006 | Steinshnider et al. | 429/26 |
| 2007/0207371 A1 | 9/2007 | Ushio et al. | |
| 2007/0259233 A1 | 11/2007 | Yang et al. | |
| 2008/0085437 A1 * | 4/2008 | Dean et al. | 429/26 |
| 2008/0226964 A1 * | 9/2008 | Nishiyama et al. | 429/34 |
| 2013/0011769 A1 | 1/2013 | Kusakabe et al. | |

FOREIGN PATENT DOCUMENTS

| | | |
|---|---|---|
| CN | 1656638 A | 8/2005 |
| CN | 101356673 A | 1/2009 |
| JP | 06-068886 | 3/1994 |
| JP | 08-138704 | 5/1996 |
| JP | 11-126623 | 5/1999 |

(Continued)

OTHER PUBLICATIONS

Machine English translation of JP 2002-134156, 5 pages.

(Continued)

*Primary Examiner* — Patrick Ryan
*Assistant Examiner* — Lucas J O Donnell
(74) *Attorney, Agent, or Firm* — Christie, Parker & Hale, LLP (57) ABSTRACT

The fuel cell system includes a fuel cell stack, a fuel supply supplying a fuel to the fuel cell stack, and an oxidizing agent supply supplying an oxidizing agent to the fuel cell stack. The fuel cell stack includes a first end plate, a moisture exchanger, an electrical generator, and a second end plate. The moisture exchanger includes a first area where a dried supply oxidizing agent flows, a second area where a humid emission fuel flows, and a third area where a humid emission oxidizing agent flows, and the first area exchanges moisture with the second and third areas using a moisture exchange layer.

18 Claims, 9 Drawing Sheets

(56) References Cited

FOREIGN PATENT DOCUMENTS

| JP | 2002-134156 | 5/2002 |
|----|-------------|--------|
| JP | 2003-031246 | 1/2003 |
| JP | 2003-187838 | 7/2003 |
| JP | 2004-039357 | 2/2004 |
| JP | 2004-206951 | 7/2004 |
| KR | 10-2009-0001165 | 1/2009 |
| WO | WO 2008/037079 A1 | 4/2008 |

OTHER PUBLICATIONS

Machine English translation of JP 2003-131246, 12 pages.
Machine English translation of JP 2003-187838, 9 pages.
European Search Report dated Jun. 27, 2011, for corresponding European Patent application 10252207.5, noting listed references in this IDS.
SIPO Office action dated May 29, 2013, with English translation, corresponding to Chinese Patent application 201110079318.X, (17 pages).
Patent Abstracts of Japan, and English machine translation of Japanese Publication 06-068886 listed above, (8 pages).
Patent Abstracts of Japan, and English machine translation of Japanese Publication 08-138704 listed above, (32 pages).
Patent Abstracts of Japan, and English machine translation of Japanese Publication 11-126623 listed above, (7 pages).
Patent Abstracts of Japan, and English machine translation of Japanese Publication 2004-206951 listed above, (13 pages).

* cited by examiner

FUEL CELL SYSTEM

CROSS-REFERENCE TO RELATED APPLICATIONS

This application claims the benefit of U.S. Provisional Application Nos. 61/321,398, filed on Apr. 6, 2010, and 61/323,280, filed on Apr. 12, 2010, in the United States Patent and Trademark Office, the disclosures of which are incorporated herein in their entirety by reference.

BACKGROUND

1. Field

The present invention relates to a fuel cell system.

2. Description of the Related Art

A fuel cell system typically includes a fuel cell stack that generates electrical energy using electrochemical reaction of a fuel (hydrocarbon-based fuel, pure hydrogen, or reformed gas rich in hydrogen) and an oxidizing agent (air or pure oxygen). A direct oxidation type of fuel cell uses a liquid or gas hydrocarbon-based fuel, and a polymer electrolyte type of fuel cell uses pure hydrogen or a reformed gas rich in hydrogen.

The fuel cell stack includes a plurality of membrane electrode assemblies (MEAS) and separator located between each adjacent MEAS.

The MEA includes an electrolyte membrane, an anode formed at one side of the electrolyte membrane, and a cathode formed at the other side of the electrolyte membrane. The separator forms a fuel channel at one side facing the anode to supply a fuel to the anode, and forms an oxidizing channel at one side facing the cathode to supply an oxidizing agent to the cathode.

A large home fuel cell system is equipped with a humidifying device for fuel humidification and a humidifying device for humidification of an oxidizing agent to control humidity of a fuel or an oxidizing agent supplied to a fuel cell stack. However, in this case, water should be continuously supplied to the humidifying device and a heater and various sensors are required for temperature control, thereby increasing the volume of the fuel cell system and the number of parts required.

A mobile fuel cell system used for vehicles may include a reformer as a hydrogen generation device. In this case, a large amount of moisture is included in a fuel so that a moisture control device is required to continuously eliminate a constant amount of water, and a cooling device and various sensors and control devices are required for the moisture control so that the volume of the fuel cell system is increased and the number of parts is also increased.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a fuel cell system that has a simplified configuration by being able to supply an oxidizing agent containing moisture to a fuel cell stack without needing an additional device, such as a humidifying device or a moisture control device, and also minimizing volume expansion and the number of parts.

In one embodiment, a moisture exchanger is provided including a first plate, a third plate, and a second plate between the first and third plates; a first moisture exchange layer between the first plate and the second plate, and forming a second area (first flow path) between the first plate and the first moisture exchange layer for receiving and outputting a first fuel ("emission fuel"); and a second moisture exchange layer between the second plate and the third plate, and forming a third area (fourth flow path) between the third plate and the second moisture exchange layer for receiving and outputting a second oxidizing agent ("emission oxidizing agent"), wherein a first area (second and third flow paths) for receiving and outputting a first oxidizing agent ("supply oxidizing agent") is between the first and second moisture exchange layers.

In one embodiment, the first fuel includes a fuel that passed through an electrical generator of a fuel cell stack, the second oxidizing agent includes an oxidizing agent that passed through the electrical generator, and the first oxidizing agent includes an oxidizing agent supplied by an oxidizing agent supply. Additionally, the first moisture exchange layer is configured to absorb moisture from the first fuel and to supply the moisture from the first fuel to the first oxidizing agent, and the second moisture exchange layer is configured to absorb moisture from the second oxidizing agent and to supply the moisture from the second oxidizing agent to the first oxidizing agent.

In one embodiment, at least one of the first, second and third areas has a plurality of protrusions located thereon, and such protrusions may be rectangular in shape and may be arranged in a matrix. Further, at least one of the first and second moisture exchange layers may include a sulfonated tetrafluoroethylene copolymer or a porous membrane having micropores.

In one embodiment, the first area includes a flow path between the first moisture exchange layer and the second plate and another flow path between the second moisture exchange layer and the second plate, wherein the second plate has an opening connecting the flow paths. Additionally, the first plate may have an opening (first oxidizing agent opening) for receiving the first oxidizing agent, and the third plate may have an opening (first oxidizing agent opening) for supplying the first oxidizing agent to an electrical generator of the fuel cell stack. Further, the second plate may have a first groove (first oxidizing agent groove) on a first side facing the first moisture exchange layer at a location corresponding to the openings, and a second groove (second oxidizing agent groove) on a second side facing the second moisture exchange layer at a location corresponding to the openings.

In one embodiment, each of the first moisture exchange layer and the second moisture exchange layer has an opening aligned with the openings and the first and second grooves. Also, the first plate may have a groove and a fuel opening (third fuel opening) at respective corners that are substantially diagonal to each other, wherein the second area is configured to receive the first fuel at the groove and to output the first fuel through the fuel opening. In one embodiment, the first moisture exchange layer, the second plate, the second moisture exchanger layer and the third plate each have an opening aligned with the groove.

In one embodiment, the first, second and third plates and the first and second moisture exchange layers each have an opening that is aligned with each other, for passing through a second fuel received from a fuel supply.

In one embodiment, a fuel cell stack is provided including a first end plate; a moisture exchanger adjacent the first end plate, for receiving a fuel ("emission fuel"), a first oxidizing agent ("supply oxidizing agent") and a second oxidizing agent ("emission oxidizing agent"), and for transferring moisture from the fuel and the second oxidizing agent to the first oxidizing agent; a second end plate; and an electrical generator between the second end plate and the moisture exchanger for receiving the first oxidizing agent that has been humidified in the moisture exchanger.

In embodiments, the moisture exchanger is between the electrical generator and the first end plate and the first end plate is between the electrical generator and the moisture exchanger.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
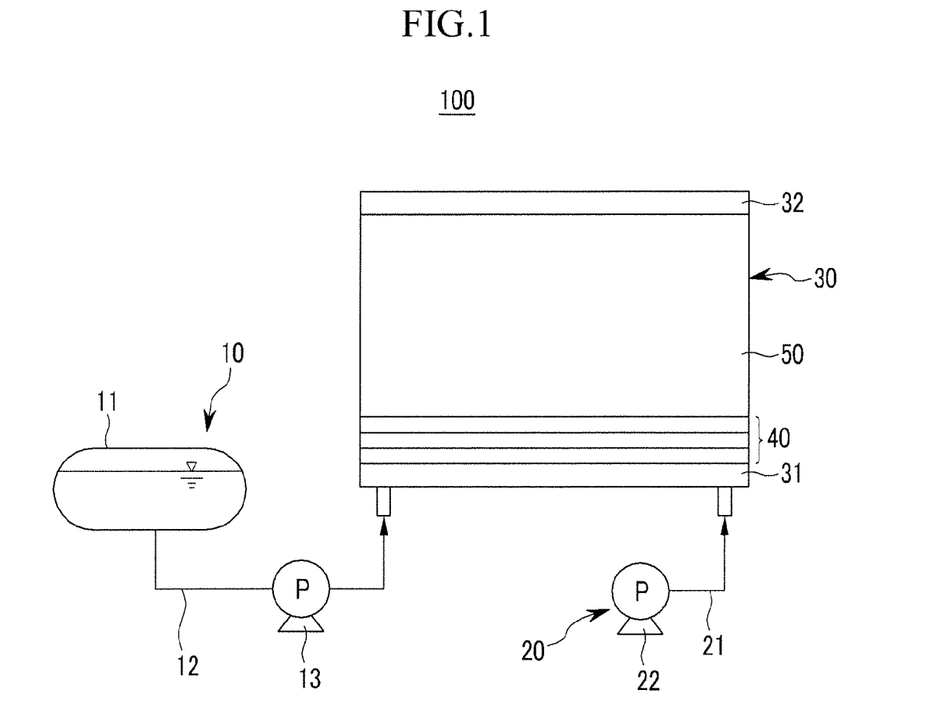
FIG. 1 is a schematic diagram of a fuel cell system according to an exemplary embodiment of the present invention.

FIG. 1 shows a schematic diagram of a fuel cell system according to a first exemplary embodiment of the present invention.

Referring to FIG. 1, a fuel cell system 100 according to the first exemplary embodiment includes a fuel cell stack 30, a fuel supply 10 supplying a fuel to the fuel cell stack 30, and an oxidizing agent supply 20 supplying an oxidizing agent to the fuel cell stack 30.

The fuel is a hydrocarbon-based fuel existing in a liquid or gas state such as methanol, ethanol, liquefied natural gas, gasoline, and butane gas, and the oxidizing agent is external air or oxygen gas. The fuel cell system 100 may be formed as a direct oxidation type that directly uses hydrocarbon-based fuel.

The fuel supply 10 includes a fuel tank 11 storing a liquid or gas fuel, a fuel supply pipe 12 connecting the fuel tank 11 to the fuel cell stack 30, and a fuel pump 13 connected to the fuel tank 11. The fuel pump 13 discharges the fuel stored in the fuel tank 11 with a pumping force to supply the fuel to the fuel cell stack 30 through the fuel supply pipe 12.

The oxidizing agent supply 20 includes an oxidizing agent supply pipe 21 connected to the fuel cell stack 30 and an oxidizing agent pump 22 installed in the oxidizing agent supply pipe 21. The oxidizing agent pump 22 draws in external air with a pumping force to supply an oxidizing agent to the fuel cell stack 30 through the oxidizing agent supply pipe 21. In this case, a control valve may be installed in the oxidizing agent supply unit 21 to control the supply of the oxidizing agent.

The fuel cell stack 30 includes a first end plate 31, a moisture exchanger 40, an electrical generator 50 formed of a plurality of membrane electrode assemblies (MEAS) and a plurality of separators, and a second end plate 32. The moisture exchanger 40 may be located between the first end plate 31 and the electrical generator 50, or may be located outside of the first end plate 31. FIG. 1 exemplarily illustrates that the moisture exchanger 40 is located between the first end plate 31 and the electrical generator 50.

Figure 2:
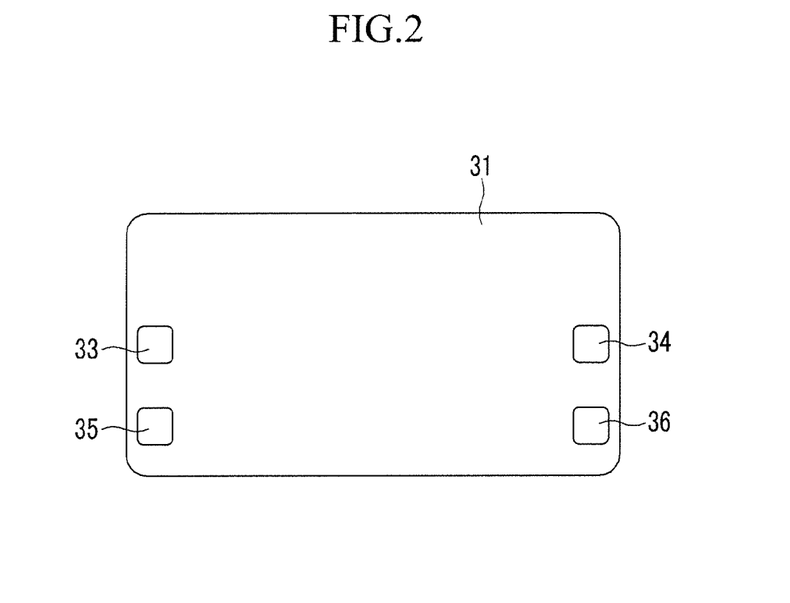
FIG. 2 is a top plan view of a first end plate of the fuel cell system of FIG. 1.

FIG. 2 is a top plan view of the first end plate of the fuel cell system of FIG. 1.

Referring to FIG. 1 and FIG. 2, a fuel inlet 33 connected to the fuel supply pipe 12, an oxidizing agent inlet 34 connected to the oxidizing agent supply pipe 21, and a fuel outlet 35 and an oxidizing agent outlet 36 for discharging unreacted fuel and unreacted oxidizing agent, respectively, passed through the electrically generator 50 are formed in the first end plate 31. The shapes and locations of the fuel inlet 33, the oxidizing agent inlet 34, the fuel outlet 35, and the oxidizing agent outlet 36 formed in the first end plate 31 are not limited to those shown and described, but rather, may be modified as necessary.

Since the fuel cell system 100 does not have a separate humidifying device, the oxidizing agent (external air) supplied to the oxidizing agent inlet 34 is dried (having no or a relatively low moisture content), but the unreacted oxidizing agent and the unreacted fuel having passed through the electrical generator 50 include a relatively large amount of moisture. For convenience, the oxidizing agent supplied to the oxidizing agent inlet 34 and the fuel supplied to the fuel inlet 33 are referred to as a supply oxidizing agent and a supply fuel, respectively, and the unreacted oxidizing agent and the unreacted fuel having passed through the electrical generator 50 are referred to as an emission oxidizing agent and an emission fuel, respectively.

The moisture exchanger 40 moisture-exchanges the dried supply oxidizing agent and the humid emission oxidizing agent and simultaneously moisture-exchanges the dried supply oxidizing agent and the humid emission fuel. That is, the moisture exchanger 40 moves moisture included in the emission oxidizing agent and the emission fuel to the dried supply oxidizing agent to humidify the oxidizing agent supplied to the electrical generator 50 with a predetermined humidity.

Figure 3:
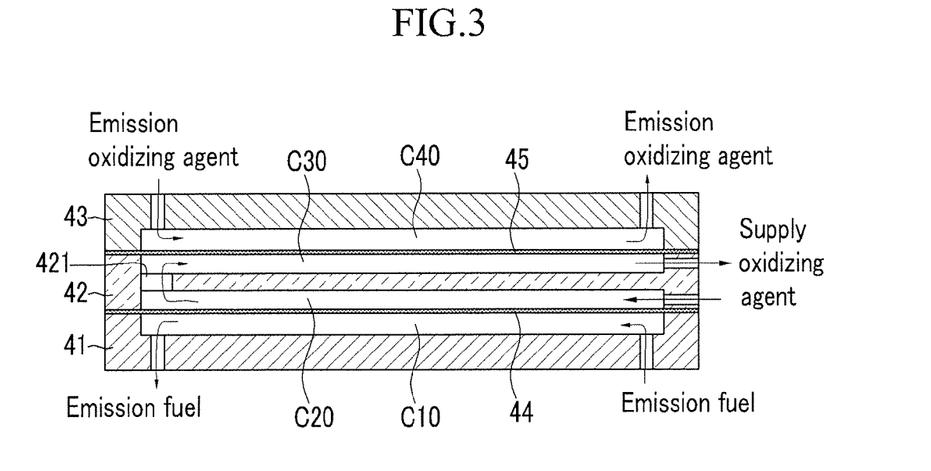
FIG. 3 is a schematic diagram of a moisture exchanger of the fuel cell system of FIG. 1.

FIG. 3 shows a schematic diagram of the moisture exchange of the fuel cell system of FIG. 1.

Referring to FIG. 3, the moisture exchanger 40 includes a first plate 41 forming a first flow path C10, a second plate 42 forming a second flow path C20 and a third flow path C30 that are connected to each other, a third plate 43 forming a fourth flow path C40, a first moisture exchange layer 44 located between the first and second flow paths C10 and 020, and a second moisture exchange layer 45 located between the third and fourth flow paths C30 and C40.

The first flow path C10 and the fourth flow path C40 are independent flow paths separated from other flow paths. The second flow path C20 and the third flow path C30 are connected only to each other and are separated from the first and fourth flow paths C10 and C40. The second plate 42 may form the second flow path C20 at one side thereof and may form the third flow path C30 at the other side. In addition, the second plate 42 may connect the second flow path C20 and the third flow path C30 by forming a penetration hole (opening) 421.

A humid emission oxidizing agent flows through the first flow path C10 or the fourth flow path C40, and a humid emission fuel flows through the other. In addition, a dried supply oxidizing agent flows through the second and third flow paths C20 and C30. FIG. 3 exemplarily illustrates the humid emission fuel flow through the first flow path C10 and the humid emission oxidizing agent flow through the fourth flow path C40.

In this case, an inlet of the first flow path C10 and an inlet of the fourth flow path C40 are connected to the electrical generator 50 (refer to FIG. 1), an outlet of the first flow path C10 is connected to the fuel outlet 35 (refer to FIG. 2), and an outlet of the fourth flow path C40 is connected to the oxidizing agent outlet 36 (refer to FIG. 2). The supply oxidizing agent introduced to the second flow path C20 is passed through the third flow path C30 and then discharged. The inlet of the second flow path C20 is connected to the oxidizing agent inlet 34 (refer to FIG. 2) and an outlet of the third flow path C30 is connected to the electrical generator 50 (refer to FIG. 1).

Accordingly, the dried supply oxidizing agent introduced to the second flow path C20 undergoes moisture exchange with the humid emission fuel flowing through the first flow path C10 and is then humidified for the first time. The supply oxidizing agent moved to the third flow path C30 from the second flow path C20 undergoes moisture exchange with the humid emission oxidizing agent flowing through the fourth flow path C40 and is then humidified for the second time.

That is, the first moisture exchange layer 44 absorbs moisture from the humid emission fuel and transmits the absorbed moisture to the supply oxidizing agent of the second flow path C20. Thus, moisture content in the supply oxidizing agent of the second flow path C20 is increased, and the emission fuel having experienced moisture exchange is emitted through the outlet of the first flow path C10. A second moisture exchange layer 45 absorbs moisture from a humid emission oxidizing agent of the fourth flow path C40, and transmits the absorbed moisture to the supply oxidizing agent of the third flow path C30. Thus, the moisture content of the supply oxidizing agent of the third flow path C30 is further increased, and the emission oxidizing agent having experienced the moisture exchange is emitted through the outlet of the fourth flow path C40.

The first and second moisture exchange layers 44 and 45 may be replaced with various material layers that do not have permeability to gas and absorbing moisture. For example, a membrane formed of a sulfonated tetrafluorethylene copolymer (for example, NAFION®) or a porous membrane having micropores may be used as the first and second moisture exchange layers 44 and 45.

As described, the moisture exchanger 40 includes a first area (the second and third flow paths) in which a dried supply oxidizing agent flows, a second area (the first flow path) in which a humid emission fuel flows, and a third area (the fourth flow path) in which a humid emission oxidizing agent flows, and the first area experiences moisture exchange with the second and third areas by the first and second moisture exchange layers 44 and 45. Therefore, the fuel cell system 100 according to the present exemplary embodiment can effectively humidify the supply oxidizing agent using the moisture exchanger 40 without having an additional humidifying device.

If a dried oxidizing agent is supplied to the electrical generator 50, an area where the oxidizing agent is first introduced to the cathode of the MEA is operated in the dried state, and thus the MEA is deteriorated and electricity generation efficiency is decreased. The fuel cell stack according to the present exemplary embodiment prevents the dry oxidizing agent from reaching the electrical generator 50 so that deterioration of the MEA can be prevented and electricity generation efficiency can be increased.

The moisture exchanger 40 may be formed by stacking the first plate 41, the first moisture exchange layer 44, the second plate 42, the second moisture exchange layer 45, and the third plate 43. The first flow path C10 and the second flow path C20 include the first moisture exchange layer 44 therebetween, and the third flow path C30 and the fourth flow path C40 include the second moisture exchange layer 45 therebetween. Such a laminate type of moisture exchanger 40 can maximize the area of the first to fourth flow paths C10, C20, C30, and C40 experiencing moisture exchange so that moisture exchange efficiency can be increased.

Figure 4:
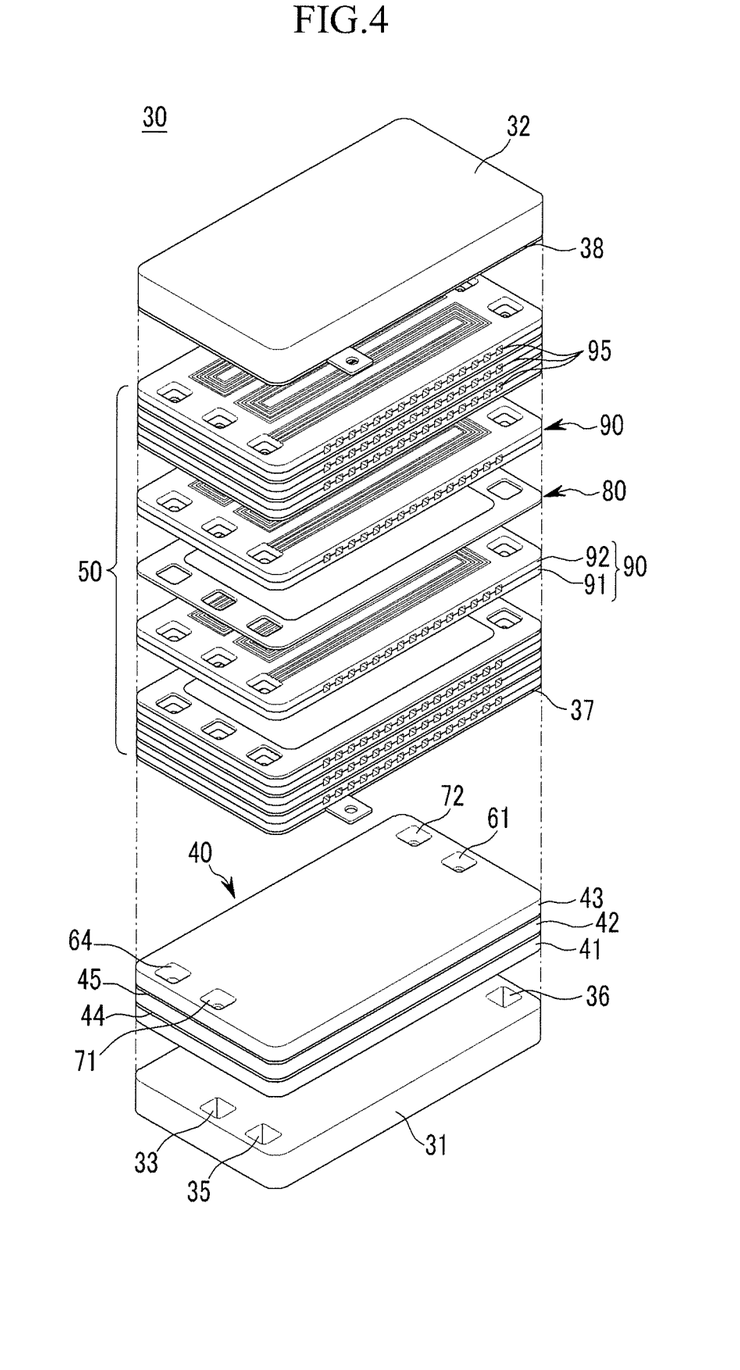
FIG. 4 is an exploded perspective view of a fuel cell stack of the fuel cell system of FIG. 1.

A detailed internal structure of the substantially applicable moisture exchanger 40, the structure of the fuel cell stack 30, and moving paths of the fuel and the oxidizing agent will now be described in further detail. FIG. 4 shows an exploded perspective view of the fuel cell stack of the fuel cell system of FIG. 1.

Referring to FIG. 4, the fuel cell stack 30 includes the first end plate 31, the moisture exchanger 40, a first current collecting plate 37, an electrical generator 50, a second current collecting plate 38, and a second end plate 32. A plurality of coupling bolts may penetrate through at least four corners of the fuel cell stack 30 and are fastened by a fastening nut to integrally fix the fuel cell stack 30.

The first end plate 31 may have a rectangular shape, and, as shown in FIG. 2, the oxidizing agent inlet 34 and the oxidizing agent outlet 36 may be formed at one short side and the fuel inlet 33 and the fuel outlet 35 may be formed at the other short side. The oxidizing agent inlet 34 and the fuel inlet 33 may be placed at the center of the short side, and the oxidizing agent outlet 36 and the fuel outlet 35 may be placed at the corner of the short side.

The moisture exchanger 40 includes a first plate 41 contacting the first end plate 31, a second plate 42 on the first plate 41 including the first moisture exchange layer 44 therebetween, and a third plate 43 on the second plate 42 including the second moisture exchange layer 45 therebetween and contacting the first current collecting plate 37.

Figure 5:
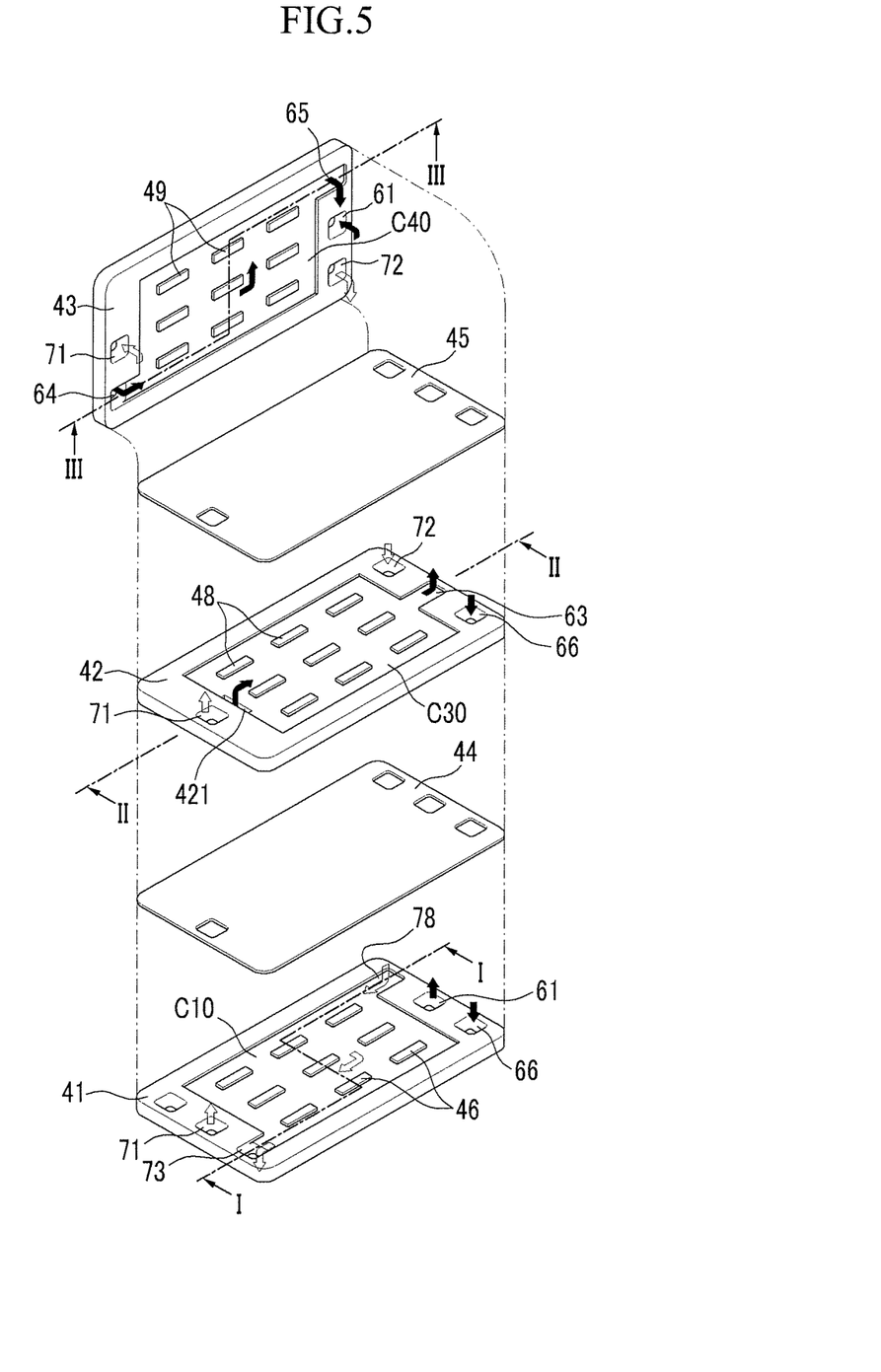
FIG. 5 is an exploded perspective view of the moisture exchanger of FIG. 4.
Figure 6:
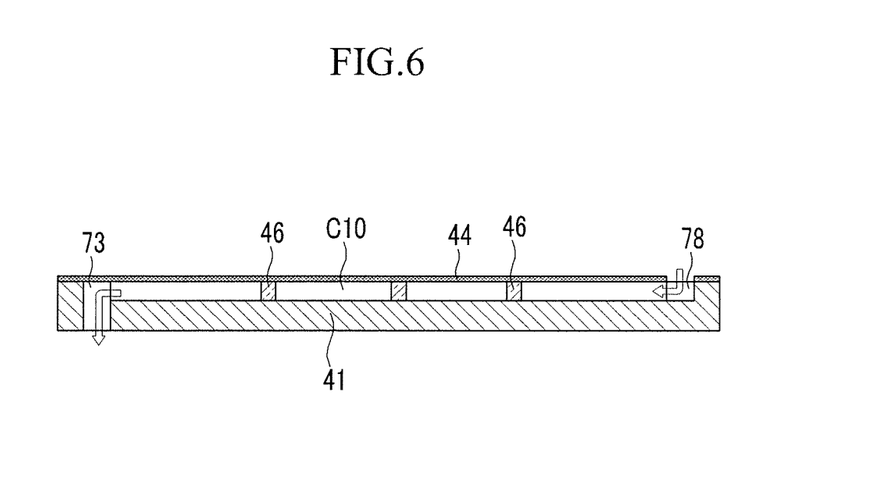
FIG. 6 is a cross-sectional view of a first plate, taken along the line I-I of FIG. 5.
Figure 7:
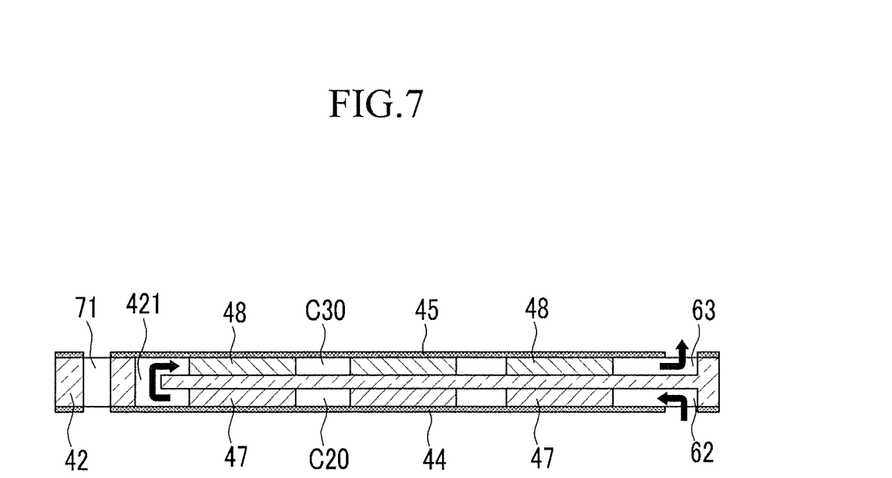
FIG. 7 is a cross-sectional view of a second plate, taken along the line II-II of FIG. 5.
Figure 8:
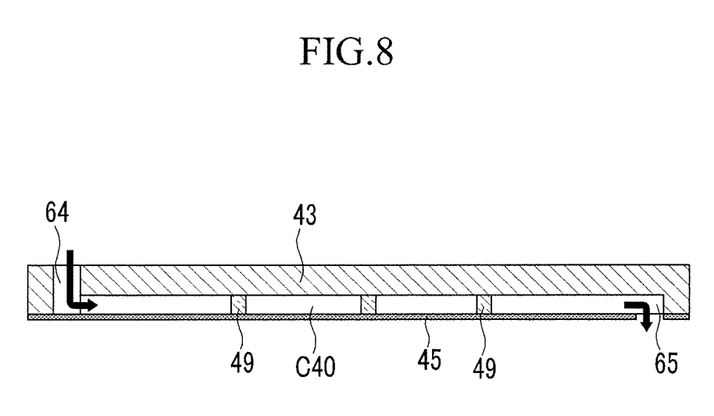
FIG. 8 is a cross-sectional view of a third plate, taken along the line III-III of FIG. 5.

FIG. 5 shows an exploded perspective view of the moisture exchanger of FIG. 4, and FIG. 6, FIG. 7, and FIG. 8 respectively show cross-sectional views of the first plate taken along the line I-I of FIG. 5, the second plate taken along the line II-II of FIG. 5, and the third plate taken along the line of FIG. 5.

Referring to FIG. 5 to FIG. 8, the first flow path C10 is formed on the upper side of the first plate 41. The second flow path C20 is formed at the bottom side of the second plate 42, and the third flow path C30 is formed on the upper side of the third flow path C30. The second plate 42 has a penetration hole 421 at an overlapped portion of the second and third flow paths C20 and C30 to connect the second flow path C20 and the third flow path C30. In addition, the fourth flow path C40 is formed at the bottom side of the third plate 43.

The first to fourth flow paths C10, C20, C30, and C40 are each formed of a concave groove having a depth, and may be formed having a generally rectangular shape at the center portion excluding the lateral short sides of each of the first to third plates 41, 42, and 43.

The first moisture exchange layer 44 covers the first and second flow paths C10 and C20 to absorb moisture from the humid emission fuel flowing in the first flow path C10, and to transmit the absorbed moisture to the dried supply oxidizing agent flowing in the second flow path C20. The second moisture exchange layer 45 covers the third and fourth flow paths C30 and C40 to absorb moisture from the humid emission oxidizing agent flowing in the fourth flow path C40, and transmits the absorbed moisture to the supply oxidizing agent of the third flow path C30.

The first and second moisture exchange layers 44 and 45 may be formed with the same first to third plates 41, 42, and 43, or may have a shape corresponding to the first to fourth flow paths C10, C20, C30, and C40. In FIG. 5, the first and second moisture exchange layers 44 and 45 have substantially the same size as the first to third plates 41, 42, and 43.

A plurality of first spacers 46 protrude from the first flow path C10 and a plurality of second spacers 47 protrude from the second flow path C20 to support the first moisture exchange layer 44. The first spacers 46 disperse flow of the emission fuel for substantially uniform distribution of the emission fuel over the entire area of the first flow path C10. The second spacers 47 disperse flow of the supply oxidizing agent for substantially uniform distribution of the supply oxidizing agent over the entire area of the second flow path C20.

A plurality of third spacers 48 protrude from the third flow path C30 and a plurality of fourth spacers 49 protrude from the fourth flow path C40 to support the second moisture exchange layer 45. The third spacers 48 disperse flow of the supply oxidizing agent for substantially uniform distribution of the supply oxidizing agent over the entire area of the third flow path C30. The fourth spacers 49 disperse flow of the emission oxidizing agent for substantially uniform distribution of the emission oxidizing agent over the entire area of the fourth flow path C40.

The first to fourth spacers 46, 47, 48, and 49 may have a bar shape parallel with long sides of the first to third plates 41, 42, and 43, and are spaced from each other. The shapes of the first to fourth spacers 46, 47, 48, and 49 are not limited to those shown in FIG. 5, but rather, they may be of any suitable shape.

In addition, first oxidizing agent openings 61 are respectively formed at a center of one of short sides of the first and third plates 41 and 43. The first oxidizing agent openings 61 are located generally corresponding to the oxidizing agent inlet 34 (refer to FIG. 2) of the first end plate 31, and are spaced from the first and fourth flow paths C10 and C40.

A first oxidizing agent groove 62 is located generally corresponding to the first oxidizing agent opening 61 in the bottom side of the second plate 42, and a second oxidizing agent groove 63 is formed generally corresponding to the first oxidizing agent groove 62 in the upper side of the second plate 42. The second flow path C20 is connected with the first oxidizing agent groove 62, and the third flow path C30 is connected with the second oxidizing agent groove 63. The penetration hole 421 is located at the opposite side of the first and second oxidizing agent grooves 62 and 63. Thus, the second plate 42 provides a supply oxidizing agent moving path formed from the first oxidizing agent groove 62 to the second oxidizing agent groove 63 through the second flow path C20, the penetration hole 421, and the third flow path C30.

A second oxidizing agent opening 64 is formed at the corner of the other short side of the third plate 43. In addition, a third oxidizing agent groove 65 is formed at one of the corners of the short side of the third plate 43, facing the second oxidizing agent opening 64 along the diagonal direction. The fourth flow path C40 is connected with the second oxidizing agent opening 64 and the third oxidizing agent groove 65.

Third oxidizing agent openings 66 are respectively formed at the first and second plates 41 and 42 generally corresponding to where the third oxidizing agent groove 65 is formed. The third oxidizing agent openings 66 are located spaced from the first flow path C10, the second flow path C20, and the third flow path C30. The third oxidizing agent opening 66 of the first plate 41 is formed generally corresponding to the oxidizing agent outlet 36 (refer to FIG. 2) of the first end plate 31.

First fuel openings 71 are formed at centers of each of the other short sides of the first to third plates 41, 42, and 43. The first fuel openings 71 are respectively located spaced from the first to fourth flow paths C10, C20, C30, and C40. The first fuel opening 71 is formed generally corresponding to the fuel inlet 33 (refer to FIG. 2) of the first end plate 31. Second fuel openings 72, 78 are formed at a corner of one of short sides of the first to third plates 41, 42, and 43. The second fuel openings 72, 78 are spaced from the second to fourth flow paths C20, C30, and C40.

A third fuel opening 73 is formed at a corner of the other short side of the first plate 41, facing the second fuel opening 72 of the first plate 41 along the diagonal direction. The first flow path C10 is connected with the second fuel opening 72 and the third fuel opening 73. The third fuel opening 73 is formed generally corresponding to the fuel outlet 35 (refer to FIG. 2) of the first end plate 31.

When the first and second moisture exchange layers 44 and 45 and the first to third plates 41, 42, and 43 are the same in size, portions of the first and second moisture exchange layers 44 and 45, corresponding to the first fuel opening 71, the second fuel opening 72, the first oxidizing agent opening 61, and the third oxidizing agent opening 66 are eliminated to thereby expose the openings.

Referring to FIG. 4 to FIG. 8, the supply oxidizing agent introduced through the oxidizing agent inlet 34 (refer to FIG. 2) of the first end plate 31 is passed through the first oxidizing agent opening 61 of the first plate 41 and supplied to the first oxidizing agent groove 62 of the first oxidizing agent opening 61. The supply oxidizing agent passed through the second flow path C20 penetrates the penetration hole 421 and then moves to the third flow path C30. After passing through the third flow path C30, the supply oxidizing agent is emitted the outside of the moisture exchanger 40 through the second oxidizing agent groove 63 and the first oxidizing agent opening 61 of the third plate 43.

The emitted supply oxidizing agent directly passes the electrical generator 50, and the flow direction of the supply oxidizing agent is changed at the second end plate 32 and then the supply oxidizing agent is supplied to each of the MEAs 80 forming the electrical generator 50. Unreacted oxidizing agents having passed through the MEAs 80 are emission oxidizing agents that are rich in moisture.

The humid emission oxidizing agent enters the fourth flow path C40 through the second oxidizing agent opening 64 of the third plate 43. After passing through the fourth flow path C40, the humid oxidizing agent is emitted to the oxidizing agent outlet 36 of the first end plate 31 through the third oxidizing agent groove 65 and the third oxidizing agent openings 66 of the second and third plates 42 and 41. While the humid oxidizing agent flows through the fourth flow path C40, the second moisture exchange layer 45 absorbs moisture from the emission oxidizing agent, and transmits the absorbed moisture to the supply oxidizing agent of the third flow path C30 to humidify the supply oxidizing agent.

The fuel introduced through the fuel inlet of the first end plate 31 is passed through the first fuel openings 71 of the first to third plates 41, 42, and 43 and then emitted outside of the moisture exchanger 40. The emitted fuel is passed through the electrical generator 50, and the flow direction of the fuel is changed at the second end plate 32 and the supply fuel is supplied to each of the MEA 80 forming the electrical generator 50. Unreacted fuel having passed through the MEAs 80 is emission fuel that is rich in moisture.

The humid emission fuel enters the first flow path C10 through the second fuel openings 72, 78 of the third plate 43, the second plate 42, and the first plate 41. After passing through the first flow path C10, the emission fuel is emitted to the fuel outlet 35 of the first end plate 31 through the third fuel opening 73. While the humid emission fuel flows through the first flow path C10, the first moisture exchange layer 44 absorbs moisture from the emission fuel and transmits the absorbed moisture to the supply oxidizing agent of the second flow path C20 to humidify the supply oxidizing agent.

Figure 9:
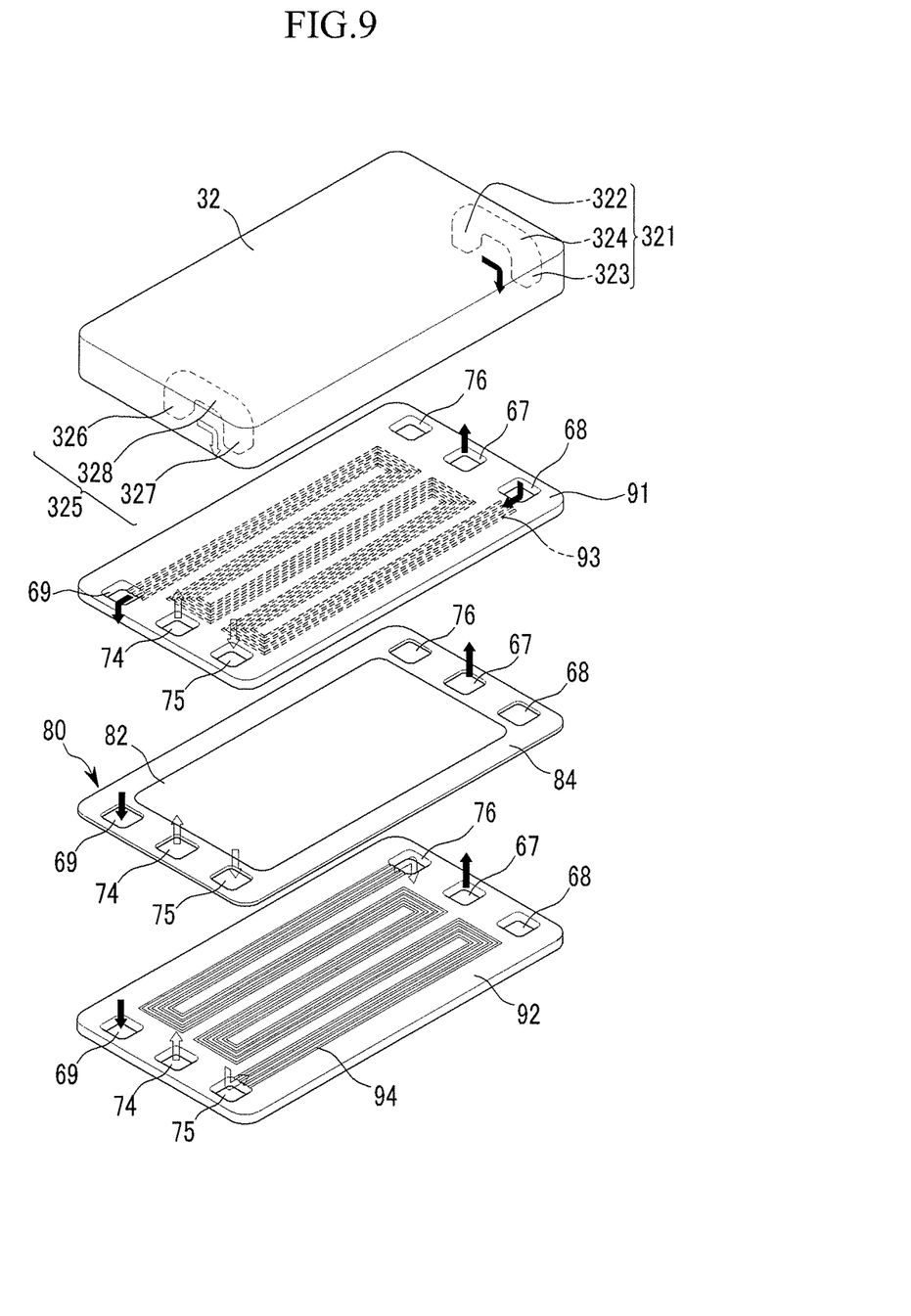
FIG. 9 is an exploded perspective view of an electrical generator and the second end plate of the fuel cell stack of FIG. 4.
Figure 10:
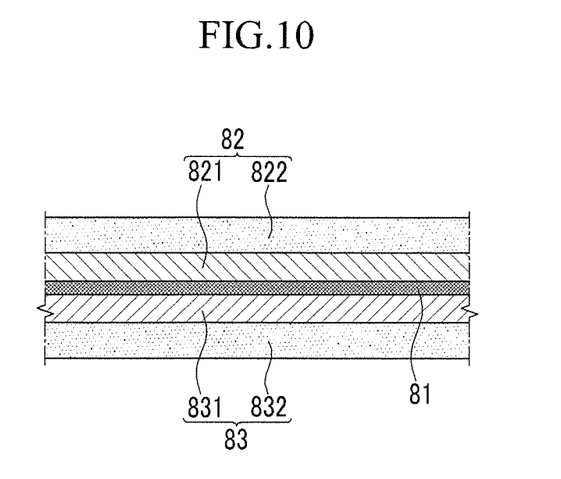
FIG. 10 is a partially enlarged cross-sectional view of a membrane electrode assembly of the electrical generator of FIG. 9.

FIG. 9 shows an exploded perspective view of the electrical generator and the second end plate of FIG. 4, and FIG. 10 shows a partial exploded cross-sectional view of the MEA of the electrical generator of FIG. 9.

Referring to FIG. 9 and FIG. 10, the electrical generator 50 includes the plurality of MEAs and the plurality of separators 90 (refer to FIG. 4), one separator located between adjacent MEAs 80. FIG. 9 illustrates one MEA 80 and two separators 91 and 92 for convenience. The MEA 80 includes an electrolyte membrane 81, a cathode 82 formed at one side of the electrolyte membrane 81, an anode 83 formed at the other side of the electrolyte membrane 81, and a supporting film 84 supporting the edge of the electrolyte membrane 81.

The cathode 82 includes a catalyst layer 821 converting oxygen in the oxidizing agent into electrons and oxygen ions by a reduction reaction, and a gas diffusion layer 822 covering the catalyst layer 821. The anode 83 includes a catalyst layer 831 converting hydrogen in the fuel into electrons and hydrogen ions by an oxidation reaction, and a gas diffusion layer 832 covering the catalyst layer 831.

The separator 90 includes a cathode separator 91 contacting the cathode 82 and an anode separator 92 contacting the anode 83. The cathode separator 91 forms an oxidizing agent channel 93 at one side facing the cathode 82, and the anode separator 92 forms a fuel channel 94 at a side facing the anode 83. The cathode separator 91 and the anode separator 92 may be integrally fixed, and this is called a bipolar plate.

Cooling channels 95 (refer to FIG. 4) may be formed at inner surfaces of the cathode separator 91 and the anode separator 92. For convenience, the cooling channel is omitted in FIG. 9. The cooling channel 95 is connected with a blowing unit (coolant supplier), and external air is introduced to the cooling channel 95 by the blowing unit. With the heat exchange of the external air and the fuel cell stack 30, the temperature of the fuel cell stack 30 can be decreased.

The supporting film 84, the cathode separator 91, and the anode separator 92 of the MEA 80 form a fourth oxidizing agent opening 67 generally corresponding to the first oxidizing agent opening 61 (refer to FIG. 5) of the moisture exchanger 40, and form an oxidizing agent inlet manifold 68 generally corresponding to the third oxidizing agent opening 66 (refer to FIG. 5) of the moisture exchanger 40.

In addition, the supporting film 84, the cathode separator 91, and the anode separator 92 of the MEA 80 form an oxidizing agent outlet manifold 69 at the corner facing the oxidizing agent inlet manifold 68 along the diagonal direction. An oxidizing agent channel 93 formed in the cathode separator 91 is connected with the oxidizing agent inlet manifold 68 and the oxidizing agent outlet manifold 69.

The second end plate 32 forms a first conversion flow path 321 that converts a flowing direction of the oxidizing agent therein. The first conversion flow path 321 includes an inlet 322 generally corresponding to the fourth oxidizing agent opening 67, an outlet 323 generally corresponding to the oxidizing agent inlet manifold 68, and a connection unit 324 connecting the inlet 322 and the outlet 323.

Therefore, the supply oxidizing agent emitted from the moisture exchanger 40 is passed through the fourth oxidizing agent opening 67 of the electrical generator 50 and provided to the inlet 322 of the first conversion flow path 321, and is then passed through the connection unit 324 and the outlet 323 and introduced to the oxidizing agent inlet manifold 68 of the electrical generator 50. The oxidizing agent is provided to the cathode 82 of the MEA 80 while passing through the oxidizing agent channel 93 of the cathode separator 91, and moisture and an unreacted oxidizing agent are emitted through the oxidizing agent outlet manifold 69. The emission oxidizing agent is provided to the second oxidizing agent opening 64 (refer to FIG. 5) of the moisture exchanger 40.

The supporting film 84, the cathode separator 91, and the anode separator 92 of the MEA 80 form a fourth fuel opening 74 generally corresponding to the first fuel opening 71 (refer to FIG. 5) of the moisture exchanger 40, and form a fuel inlet manifold 75 generally corresponding to the third fuel opening 73 (refer to FIG. 5) of the moisture exchanger 40.

In addition, the supporting film 84, the cathode separator 91, and the anode separator 92 of the MEA 80 form a fuel outlet manifold 76 at the corner facing the fuel inlet manifold 75 along the diagonal direction. The fuel channel 94 formed in the anode separator 92 is connected with the fuel inlet manifold 75 and the fuel outlet manifold 76.

The second end plate 32 forms a second conversion flow path 325 that converts a flow direction of the fuel therein. The second conversion flow path 325 includes an inlet 326 generally corresponding to the fourth fuel opening 74, an outlet 327 generally corresponding to the fuel inlet manifold 75, and a connection unit 328 connecting the inlet 326 and the outlet 327.

Thus, the supply fuel emitted from the moisture exchanger 40 is passed through the fourth fuel opening 74 of the electrical generator 50 and provided to the inlet 326 of the second conversion flow path 325, and then passed through the inlet 326 and the outlet 328 and introduced to the fuel inlet manifold 75 of the electrical generator 50. The fuel is supplied to the anode 83 of the MEA 80 after passing through the fuel channel 94 of the anode separator 92, and moisture and unreacted fuel are emitted through the fuel outlet manifold 76. The emission fuel is supplied to the second fuel opening 72 (refer to FIG. 5) of the moisture exchanger 40.

Figure 11:
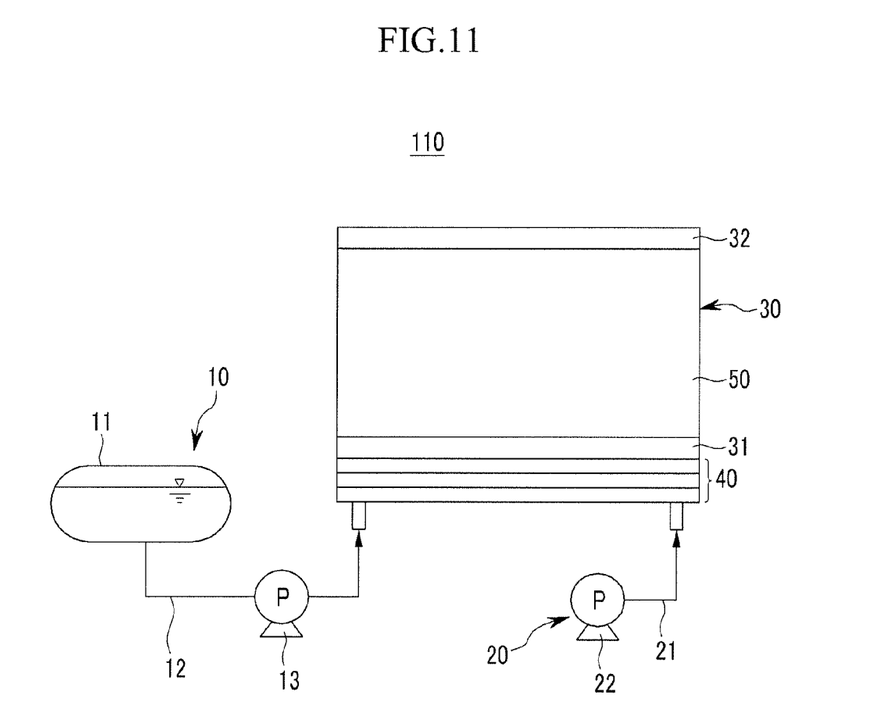
FIG. 11 is a schematic diagram of a fuel cell system according to a second exemplary embodiment of the present invention.

FIG. 11 shows a schematic diagram of a fuel cell system according to another exemplary embodiment of the present invention.

Referring to FIG. 11, a fuel cell system 110 according to the present embodiment is substantially the same as the fuel cell system of the first exemplary embodiment, except that a moisture exchanger 40 is located at the external side of a first end plate 31 and a fuel supply pipe 12 and an oxidizing agent supply pipe 21 are connected to the moisture exchanger 40. Like reference numerals designate like elements of the fuel cell system of the first exemplary embodiment.

According to the first exemplary embodiment, the moisture exchanger 40 is located between the first end plate 31 and the electrical generator 50 so that a fastening process is easy since the fuel cell stack 30 including the moisture exchanger 40 can be fastened by a single step. On the contrary, the moisture exchanger 40 according to the second exemplary embodiment is located at the external side of the first end plate 31 so that the moisture exchanger 40 and the first end plate 31 are fastened in separate steps, but the moisture exchanger 40 can be easily replaced when it needs to be fixed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A moisture exchanger comprising:
a first plate, a third plate, and a second plate between the first and third plates;
a first moisture exchange layer between the first plate and the second plate, and forming a second area between the first plate and the first moisture exchange layer for receiving and outputting a first fuel; and
a second moisture exchange layer between the second plate and the third plate, and forming a third area between the third plate and the second moisture exchange layer for receiving and outputting a second oxidizing agent, wherein the second plate directly contacts the first and second moisture exchange layers;
wherein a first area for receiving and outputting a first oxidizing agent is between the first and second moisture exchange layers, and
wherein the first fuel comprises a fuel that passed through an electrical generator of a fuel cell stack, the second oxidizing agent comprises an oxidizing agent that passed through the electrical generator, and the first oxidizing agent comprises an oxidizing agent supplied by an oxidizing agent supply.

2. The moisture exchanger of claim 1, wherein the first moisture exchange layer is configured to absorb moisture from the first fuel and to supply the moisture from the first fuel to the first oxidizing agent, and the second moisture exchange layer is configured to absorb moisture from the second oxidizing agent and to supply the moisture from the second oxidizing agent to the first oxidizing agent.

3. The moisture exchanger of claim 1, wherein at least one of the first, second and third areas has a plurality of protrusions located thereon.

4. The moisture exchanger of claim 3, wherein the protrusions are rectangular in shape and are arranged in a matrix.

5. The moisture exchanger of claim 1, wherein at least one of the first and second moisture exchange layers comprises a sulfonated tetrafluoroethylene copolymer or a porous membrane having micropores.

6. The moisture exchanger of claim 1, wherein the first area includes a flow path between the first moisture exchange layer and the second plate and another flow path between the second moisture exchange layer and the second plate, wherein the second plate has an opening connecting the flow paths.

7. The moisture exchanger of claim 1, wherein the first plate has an opening for receiving the first oxidizing agent, and the third plate has an opening for supplying the first oxidizing agent to an electrical generator of the fuel cell stack.

8. The moisture exchanger of claim 7, wherein the second plate has a first groove on a first side facing the first moisture exchange layer at a location corresponding to the openings, and a second groove on a second side facing the second moisture exchange layer at a location corresponding to the openings.

9. The moisture exchanger of claim 8, wherein each of the first moisture exchange layer and the second moisture exchange layer has an opening aligned with the openings and the first and second grooves.

10. The moisture exchanger of claim 1, wherein the first plate has a groove and a fuel opening at respective corners that are substantially diagonal to each other, wherein the second area is configured to receive the first fuel at the groove and to output the first fuel through the fuel opening.

11. The moisture exchanger of claim 10, wherein the first moisture exchange layer, the second plate, the second moisture exchanger layer and the third plate each have an opening aligned with the groove.

12. The moisture exchanger of claim 1, wherein the first, second and third plates and the first and second moisture exchange layers each have an opening that is aligned with each other, for passing through a second fuel received from a fuel supply.

13. The moisture exchanger of claim 1, wherein the third plate has an opening for receiving the second oxidizing agent, and a groove located substantially diagonally from the opening on a side facing the second moisture exchange layer.

14. The moisture exchanger of claim 13, wherein the first and second plates each have an opening for outputting the second oxidizing agent that is aligned with the groove on the third plate.

15. A fuel stack comprising:
a first end plate;
a moisture exchanger adjacent the first end plate, for receiving a fuel, a first oxidizing agent and a second oxidizing agent, and for transferring moisture from the fuel and the second oxidizing agent to the first oxidizing agent,
wherein the moisture exchanger comprises:
a first plate, a third plate, and a second plate between the first and third plates;
a first moisture exchange layer between the first plate and the second plate, and forming a second area between the first plate and the first moisture exchange layer for receiving and outputting the fuel; and
a second moisture exchange layer between the second plate and the third plate, and forming a third area between the third plate and the second moisture exchange layer for receiving and outputting the second oxidizing agent, wherein the second plate directly contacts the first and second moisture exchange layers;
wherein a first area for receiving and outputting the first oxidizing agent is between the first and second moisture exchange layers, and
wherein the first fuel comprises a fuel that passed through an electrical generator of a fuel cell stack, the second oxidizing agent comprises an oxidizing agent that passed through the electrical generator, and the first oxidizing agent comprises an oxidizing agent supplied by an oxidizing agent supply;
a second end plate; and
an electrical generator between the second end plate and the moisture exchanger for receiving the first oxidizing agent that has been humidified in the moisture exchanger.

16. The fuel cell stack of claim 15, wherein the moisture exchanger is between the electrical generator and the first end plate.

17. The fuel cell stack of claim 15, wherein the first end plate is between the electrical generator and the moisture exchanger.

18. The fuel cell stack of claim 15, wherein the first moisture exchange layer is configured to absorb moisture from the fuel and to supply the moisture from the fuel to the first oxidizing agent, and the second moisture exchange layer is configured to absorb moisture from the second oxidizing agent and to supply the moisture from the second oxidizing agent to the first oxidizing agent.

* * * * *